UNITED STATES PATENT OFFICE.

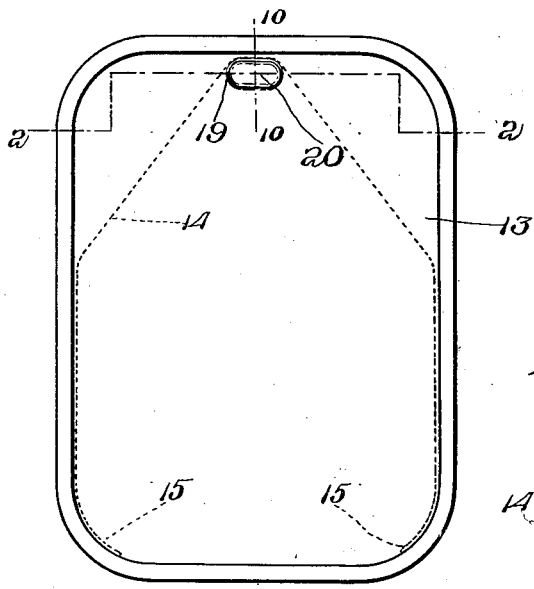

FREDRIK WATTNE, OF STAVANGER, NORWAY, ASSIGNOR OF ONE-HALF TO H. B. RITCHIE, OF BOSTON, MASSACHUSETTS.

SHEET-METAL CAN OR BOX.

955,445.   Specification of Letters Patent.   Patented Apr. 19, 1910.

Application filed July 20, 1909. Serial No. 508,652.

*To all whom it may concern:*

Be it known that I, FREDRIK WATTNE, of Stavanger, Norway, have invented certain new and useful Improvements in Sheet-Metal Cans or Boxes, of which the following is a specification.

This invention relates to a hermetically sealed can or box for preserving articles of food and other merchandise, one of the walls of the can being provided with a weakened opening line so arranged that the major portion of the wall on which the line is formed, may be detached from the remaining portion by a key adapted to wind the removed portion into a roll and thus form an opening through which the contents of the can may be removed.

The invention has for its object to provide an improved construction whereby the removable portion of the wall or top of the can may be conveniently engaged with and wound upon a key for the purpose of forming an opening in the can.

The invention consists in the improvements which I will now proceed to describe and claim.

Of the accompanying drawings, forming a part of this specification,—Figure 1 represents a top plan view of a can or box embodying my invention. Fig. 2 represents a section on line 2—2 of Fig. 1. Fig. 3 represents a top plan view of a portion of a can or box showing another embodiment of the invention. Fig. 4 represents a section on line 4—4 of Fig. 3. Fig. 5 represents a top plan view of a portion of the can or box showing another embodiment of the invention. Fig. 6 represents a section on line 6—6 of Fig. 5. Fig. 7 represents a side view of the can opening key. Fig. 8 represents a fragmentary sectional view of the form of can shown in Figs. 1 and 2, with the key applied thereto. Fig. 9 represents a fragmentary sectional view of the form of can shown in Figs. 3 and 4, the key being shown in its applied position. Fig. 10 represents an enlarged section on line 10—10 of Figs. 1 and 8. Figs. 11 and 12 are sections similar to Fig. 10, illustrating the action of the key in detaching the end portion of the tongue.

The same reference characters indicate the same parts in all the figures.

In the drawings,—12 represents the body of a sheet metal can or box, here shown as of the form of a sardine can, the bottom and sides comprising the body 12 being made in a single piece.

13 represents the top of the box, the margin of which is united to the margin of the body by a suitable interlocking seam or joint formed in a well known manner.

In carrying out my invention, I form in a suitable part of the can or box, preferably the top 13, a weakened opening line 14 which is substantially V-shaped, and has two elongated oblique stretches which converge and form the main portions of the V, and are connected by a short stretch forming the point of the V. Said line, as shown in Fig. 1, is so arranged as to form the incipient edges and end of a substantially V-shaped tongue which occupies the major portion of the top 13, the ends 15 of the opening line being preferably separated by a considerable part of one end of the top, so that when the top is severed along the opening line by the operation hereinafter described, the V-shaped tongue bounded by said line will be rolled or accumulated at one end of the top and will remain connected to the top by the portion of the latter between the ends 15 of the opening line. The narrow end portion or point of the tongue is adapted to be engaged by a key 16 of the form shown in Fig. 7. The key 16 is slotted at one end, forming two fingers 17 and 18, the finger 17 being provided with a penetrating point.

The top 13 is provided with a shoulder which stands at an angle to the general plane of the top, and is adapted to form a bearing for the penetrating finger 17, the arrangement of the shoulder being such that when the point of the finger is pressed against it, the finger is adapted to be forced through the material of the top at the narrow end or point of the V-shaped tongue without liability of slipping or glancing, and thus failing to penetrate the top. The said shoulder is in such proximity to the opening line 14 that when the finger 17 has penetrated the shoulder, it extends under the narrow end of the tongue, said narrow end being interposed between the fingers 17 and 18, so that a rotary movement of the key will detach the narrow end of the tongue from the top 13, and commence winding the tongue upon the key, the winding operation causing a progressive detachment of the tongue from the remaining portion of the top along the opening line 14 until all parts, from its narrow end to the end 15, of the opening line, have been detached.

In Figs. 1, 2, and 8, 19 represents the said shoulder which is formed by embossing the top 13 within the narrow end of the tongue, a boss 20 being thus formed which projects upwardly above the plane of the top 13 and has a recessed inner side. The penetrating finger 17 is pressed against the shoulder 19 in the direction indicated by the arrow in Fig. 7, the shoulder forming a bearing which insures the accurate passage of the finger 17 through the shoulder and the interposition of the narrow end of the tongue between the fingers 17 and 18, as indicated in Fig. 8. The key being in this position, its rotation will cause the detachment of the narrow end of the tongue from the adjacent portions of the top, and the winding of the tongue upon the key. The recessed inner side of the boss 20 is formed to interlock with the key finger 17 when the key is rotated to open the box, as indicated in Figs. 10, 11, and 12, this interlocking preventing liability of the key slipping from the tongue during the initial stage of the opening operation.

In Figs. 3 and 4, 21 represents the shoulder which in this case is formed in the portion of the top which is not removed, the shoulder being outside of and in close proximity to the narrow end of the tongue, and permitting the insertion of the pointed finger of the key in the manner illustrated in Fig. 9. The shoulder 21 is one of the narrow ends of a depression 22 formed in the top 13, said depression being narrow and elongated, and preferably having the general form of an arrow pointing toward the narrow end of the tongue, and indicating to the operator the direction of pressure required to engage the pointed finger 17 with the narrow end of the tongue.

In the construction shown in Figs. 5 and 6, the top 13 is provided with a boss 20 and a narrow, elongated depression 22, these being arranged so that the end of the boss forming the shoulder 19 is practically the continuation of the end of the depression constituting the shoulder 21, a shoulder being thus provided which has the combined height of the shoulders 19 and 21. The shoulder 21 is one of the narrow ends of the depression 22, the elongated sides of said depression being in close proximity to each other and arranged to guide the key toward the shoulder formed by the narrow inner end of the depression, and prevent the key from slipping sidewise when pressed against said shoulder.

The embodiment of my invention last described is preferred by me owing to the increased height of the shoulder and the greater certainty of properly engaging the key with the narrow end of the tongue.

By reference to Figs. 10, 11 and 12, it will be seen that the finger 17 of the key, when pushed through the shoulder 19, occupies the recessed interior of the boss 20, and that the finger 17 is caused by the rotation of the key to engage the recess at the inner side of the boss, as shown in Fig. 11. The key is thus securely engaged or interlocked with the tongue, so that it is not liable to slip off from the same during the operation of winding the tongue upon the key.

In each of the constructions above described, the shoulder furnishing an abutment for the penetrating end of the key is located below the margin of the can so that the portion of the wall containing said shoulder which is offset to form the shoulder, does not in any case project upwardly, so far as to be liable to be subjected to external pressure tending to indent the same. The inwardly offset portion or depression 22 is located entirely below the outer surface of the wall or top 13.

I claim:

1. A sheet metal can or box having in the inner side of one of its walls a weakened substantially V-shaped opening line forming the incipient edges and end of a substantially V-shaped tongue, the said wall having also an inwardly offset portion one end of which forms a bearing for a penetrating key located outside and below the weakened line at the end portion of the tongue and below the margin of the can, the sides of said offset portion being arranged to guide the key toward said shoulder.

2. A sheet metal can or box having in the inner side of one of its walls a weakened substantially V-shaped opening line forming the incipient edges and end of a substantially V-shaped tongue, the said tongue having an outwardly offset portion constituting an outwardly projecting boss having a recessed inner side and located within the opening line near the narrow end of the tongue, the margin of said boss forming a bearing for a penetrating key adapted to engage the end portion of the tongue, and the recessed inner side of the boss being adapted to be interlocked with the penetrating portion of said key when the key is rotated to open the can.

3. A sheet metal can or box having in the inner side of one of its walls a weakened substantially V-shaped opening line forming the incipient edges and end of a substantially V-shaped tongue, said wall having an inwardly offset portion constituting a key-guiding depression outside the weakened line, and an outwardly offset portion constituting a key-engaging boss located within the weakened line, said boss forming a part of the narrow end of the tongue, and having a recessed inner side adapted to be interlocked with an opening key, one end of the depression constituting a shoulder which is adjacent to and outside said line, and forms a bearing for the penetrating end of said key, the relative positions of the recess and boss being such that the portion of the key which is guided by said depression and penetrates said shoulder engages the recessed inner surface of said boss.

In testimony whereof I have affixed my signature, in presence of two witnesses.

FREDRIK WATTNE.

Witnesses:
J. E. TURSLAND,
SARA HEGLAND.